(12) United States Patent
Gómez Estrada

(10) Patent No.: US 12,329,188 B2
(45) Date of Patent: Jun. 17, 2025

(54) MACHINE FOR 3D PRINTING AND SIMULTANEOUS COOKING OF FOODS

(71) Applicant: Ikasia Technologies, S.L., Burjassot (ES)

(72) Inventor: Luis Gómez Estrada, Burjassot (ES)

(73) Assignee: Ikasia Technologies, S.L., Burjassot (ES)

( * ) Notice: Subject to any disclaimer, the term of this patent is extended or adjusted under 35 U.S.C. 154(b) by 981 days.

(21) Appl. No.: 17/156,368

(22) Filed: Jan. 22, 2021

(65) Prior Publication Data

US 2021/0137152 A1 May 13, 2021

Related U.S. Application Data

(63) Continuation of application No. PCT/ES2019/070517, filed on Jul. 23, 2019.

(51) Int. Cl.
*A23P 20/20* (2016.01)
*A23L 5/10* (2016.01)
(Continued)

(52) U.S. Cl.
CPC .............. *A23P 20/20* (2016.08); *A23L 5/15* (2016.08); *B33Y 10/00* (2014.12); *B33Y 30/00* (2014.12);
(Continued)

(58) Field of Classification Search
CPC .... A23P 20/20; A23P 2020/253; A23P 30/20; A23L 5/15; B33Y 10/00; B33Y 30/00;
(Continued)

(56) References Cited

U.S. PATENT DOCUMENTS

| 6,243,240 B1 * | 6/2001 | Ozue | G11B 15/125 |
| 2014/0265034 A1 * | 9/2014 | Dudley | B33Y 30/00 264/401 |

(Continued)

FOREIGN PATENT DOCUMENTS

| CN | 105313315 A | * | 2/2016 | |
| CN | 107297891 A | * | 10/2017 | B33Y 30/00 |

(Continued)

OTHER PUBLICATIONS

CN-105313315-A English translation (Year: 2016).*

(Continued)

*Primary Examiner* — Eric S Stapleton
*Assistant Examiner* — Yeong Juen Thong
(74) *Attorney, Agent, or Firm* — IPTechLaw

(57) ABSTRACT

The invention relates to a 3D printing machine for printing cooked foods, which contains at least one printing module comprising at least three main movable bodies:
 a printing block that includes heating elements able to cook the food simultaneously to the printing thereof;
 a printing base; and
 an oven,
wherein the main movable bodies being able to slide vertically, independently of one another, along a vertical displacement device.
The machine is specially designed for the 3D printing and simultaneous cooking of food products by means of complex elaborations including several ingredients. The invention also relates to a method for obtaining cooked foods using the machine.

20 Claims, 12 Drawing Sheets

(51) Int. Cl.
*A23P 20/25* (2016.01)
*B33Y 10/00* (2015.01)
*B33Y 30/00* (2015.01)
*B33Y 40/20* (2020.01)
*B33Y 50/02* (2015.01)
*B33Y 70/00* (2020.01)
*F24C 15/16* (2006.01)

(52) U.S. Cl.
CPC .............. *B33Y 40/20* (2020.01); *B33Y 50/02* (2014.12); *B33Y 70/00* (2014.12); *F24C 15/16* (2013.01); *A23P 2020/253* (2016.08); *A23V 2002/00* (2013.01)

(58) Field of Classification Search
CPC ......... B33Y 40/20; B33Y 50/02; B33Y 70/00; B33Y 40/00; F24C 15/16; A23V 2002/00; A21B 5/00; B29C 64/209; B29C 64/227; B29C 64/295; B29C 64/336; B29C 64/232; B29C 64/20; B29C 64/25
USPC ........................... 99/353; 264/401; 425/174.4
See application file for complete search history.

(56) References Cited

U.S. PATENT DOCUMENTS

| | | | | |
|---|---|---|---|---|
| 2015/0367580 | A1* | 12/2015 | Touma | B33Y 50/02 700/98 |
| 2016/0207260 | A1* | 7/2016 | Lee | B29C 64/245 |
| 2018/0192656 | A1* | 7/2018 | Clemens | A23L 5/10 |
| 2018/0304535 | A1* | 10/2018 | Matsushima | B41M 5/0088 |
| 2019/0124970 | A1* | 5/2019 | Erbe | A47J 44/00 |

FOREIGN PATENT DOCUMENTS

| | | | | |
|---|---|---|---|---|
| CN | 107802023 | A * | 3/2018 | A23P 30/20 |
| CN | 207412064 | U * | 5/2018 | |
| WO | 2017220335 | A1 | 12/2017 | |

OTHER PUBLICATIONS

CN-107297891-A English translation (Year: 2017).*
CN-107802023-A English translation (Year: 2018).*
CN-207412064-U english translation (Year: 2018).*
International Search Report, PCT Patent Application No. PCT/ES2019/070517, Sep. 10, 2019, 3 pages.

* cited by examiner

MACHINE FOR 3D PRINTING AND SIMULTANEOUS COOKING OF FOODS

CROSS REFERENCE TO RELATED APPLICATIONS

This application is a continuation application of the earlier PCT Application entitled "Machine for 3D Printing and Simultaneous Cooking of Foods," application serial number PCT/ES2019/070517, filed Jul. 23, 2019, now pending, which application claims priority to earlier filed Spanish Application entitled, "Maquina De Impresion 3D Y Cocinado Simultaneo De Alimentos," application serial number P201830765, filed Jul. 25, 2018, now pending, the disclosures of each of which are hereby incorporated entirely herein by reference.

FIELD OF THE INVENTION

The present invention belongs to the field of three-dimensional printing technology and in particular, in the field of cooked food printing technology.

BACKGROUND ART

Three-dimensional printing has made great progress in recent years and a multitude of techniques have been created to print objects in three dimensions. Three-dimensional printing consists of creating objects by superimposing successive layers of material. There are three most common 3D printing manufacturing methods, including stereolithography (SLA), selective laser sintering (SLS), and fused deposition method (FDM).

U.S. Pat. No. 9,321,215B2 discloses a 3D printing machine that allows three-dimensional printing of structures in vertical orientation. The products are printed directly from computer-driven data that are accurately reproduced, in a short time, using a fully automated process. More precisely, it describes the dispensing of a photocurable substance on a transparent substrate, the selective curing and solidification of said materials and the recovery of the solidified product.

The patent application US20160135493A1 discloses a 3D printer system for printing a product using different materials in a process defined by a set of instructions, in which each of the materials is contained in a capsule and has different parameters and rheological properties associated therewith. These parameters will determine how the printer will handle each material contained therein.

The way in which the printing material acquires the necessary viscosity to be extruded by the nozzle and then, once deposited on the previous layer of the object, already printed, solidifies and adheres firmly to previous layer is specific to each printing material. Some examples are the fusion of polymeric material in the form of a filament or contained in an impression cartridge melts in the hot nozzle itself and solidifies and adheres to the layer of material already printed when it cools down. Other cases such as thermosetting resins require a curing reaction for which they are exposed, once deposited on the layer of material already printed, to a source of electromagnetic radiation, in other cases a powder is deposited that is sintered by exposure to a laser beam.

In the case of 3D printing production of an edible product, in addition to the treatment required for the formation of a three-dimensional edible object that is solid enough to maintain its shape during printing, cooking is required simultaneously with printing or subsequent once the edible object has been formed.

WO2014190217A1 discloses a machine and a process for printing three-dimensional edible products. Once a desired food mixture has been created, the final food mixture can be heated or cooked using an integral oven or other appropriate heating mechanism. It allows for automatic recipe adjustment.

A method for 3D printing of edible products is disclosed in US20170164650A1. This is a method for producing edible objects using the powder bed printing technique. It starts with a composition of edible powder and at least one edible liquid, and subjects this composition to powder bed printing by depositing the edible liquid on the powder in layers and thus obtaining the 3D edible object with desired and adjustable microstructures.

U.S. Pat. No. 9,723,866B2 discloses a system for the manufacture of solid and free-form edible foods, controlled by software.

US20170245682A1 discloses a heating and cooking device inside the cooking chamber of a 3D food printer. It includes a processor-controlled laser cooking appliance that implements particular software instructions specific to the operation of the cooking and heating appliance. The laser cooking appliance includes at least one laser system with at least one laser beam capable of heating the food product to its cooking temperature. This device may also include an electromagnetic radiation heating device which is controlled by the processor and emits electromagnetic radiation to heat the food product within the cooking chamber to a temperature below its cooking temperature.

The present invention adapts 3D printing to the production of cooked meals from printing cartridges each containing a food product preserved in allowing its storage at room temperature or frozen. The layer-by-layer formation of the dish, from conditions several print cartridges, makes it possible to combine the various ingredients to form the dish according to a recipe, cooking it at the time of printing so that once the printing of the object is completed it can be consumed immediately. To achieve this, technological advances are required that go beyond the state of the art and are the object of this invention. These advances include the incorporation in the printing machine of heating systems which can be applied at each moment of the printing to cook the food at the moment required by the recipe and a system of control of all the moving elements of the machine adapted to the circular shape of the dishes and which allows to print simultaneously a sufficient number of dishes occupying a limited space.

DESCRIPTION OF THE INVENTION

The term "printing module" refers to the assembly formed by a printing block, a printing base and an oven and such that the module is capable to slide vertically, as well as the elements that compose it—printing block, printing base and oven—can slide vertically independently.

The term "movable body" refers to any of the elements of the 3D printing machine, which can slide in the z-axis.

The term "displacement device" refers to pairs of elements, such as bars and thrust bearings, spindles and gears, linear guides and straps, toothed guides and pinions, which allow the guided movement of different structures. A "vertical displacement device" shall be referred to when structures are moved by the elements in the vertical plane.

The terms "dish", "edible object" and "cooked food" are used with the same meaning.

The term "recipe" has the usual meaning, i.e. instructions for the preparation of cooked food.

The term "printing filament" or "filament" refers to the portion of ingredient that comes out of a printing cartridge during the operation of the food printing machine of the invention.

The expression "three-dimensional printing machine" refers to a machine capable of printing in three dimensions, or 3D printing.

The expression "vertical displacement" and "z-axis displacement" have the same meaning, i.e., the Z-axis is the one from top to bottom, or from vertical direction.

In this memory some elements that are shown in more than one figure can have more than one reference, because each figure has an independent numbering that starts with the number of the figure itself.

A first aspect of the present invention relates to a three-dimensional printing machine for printing cooked foods, characterized in that it contains at least one printing module, wherein said module comprises at least three main movable bodies:
- a printing block (1.6) comprising heating elements capable to cook the food simultaneously to the printing thereof, (1.2),
- a printing base (1.7), ((7.4) in FIG. 7) and
- an oven (1.8), these main movable bodies being able to slide vertically, independently of one another, along a vertical displacement device.

FIG. 1a shows an outline of a machine with three printing modules.

In a preferred embodiment, the three-dimensional printing machine for cooked food is characterized because it contains at least two modules having independent movement capability along the z-axis, and each of said modules has a capability for printing a cooked food independently.

In a more preferred embodiment, the machine further comprises a fixed body (1.1) enclosing all the printing modules, wherein said fixed body also comprises:
- the vertical displacement device,
- a lower base and
- an upper base said bases are connected together by means of the vertical displacement device fixed to said bases at their ends.

In a particular embodiment, the vertical displacement device is formed by at least three vertical sliding blocks.

In a preferred embodiment, each vertical sliding block is formed by sets of elements selected from:
- bars and thrust bearings (7.1),
- spindles and gears (7.2),
- linear guide (8.1) and straps (8.2),
- toothed guides (8.3) and pinions (8.4).

In a more preferred embodiment, each vertical sliding block is formed by two bars and one spindle.

In another preferred embodiment, the printing block comprises:
- a supporting plate (2.1) (or 7.3 in FIG. 7), circular or polygonal, capable of sliding vertically along a vertical sliding block,
- a mobile ring (2.3), attached to said supporting plate, capable to rotate with respect to its geometrical axis by means of a linear guiding system (2.4) fixed to the supporting plate, containing an R-axis (2.5) diametrically arranged to said mobile ring,
- a printing head (2.7), capable of displacing along the R-axis (2.5) and in a polar coordinate system by the combined movement of rotation of the mobile ring and displacement along the R-axis, and said printing head has means to accommodate at least one printing cartridge (3.1),
- at least one first cartridge heating element (3.5) fixed on the printing head, to heat a printing cartridge (3.1),
- at least a second nozzle heating element (3.6), for uniformly heating a printing nozzle (4.2), positioned at the end of the cartridge fixing means located on the printing head,
- at least a third filament heating element (4.1), said heating element being orientable by means of an orientation ring (4.3), said heating element can be located at any time behind the printing nozzle (4.2) and in the advance direction of the printing head.

In a preferred embodiment, the three-dimensional printing machine for cooked food comprises three vertical sliding blocks, such that
- the supporting plate slides over the three sliding blocks,
- the printing base slides onto one of the sliding blocks and
- the oven slides on a different sliding block than the one on which the printing base slides, capable of sliding each of them—plate, base and oven—by the action of at least one motor.

According to the invention, in a particular embodiment, all the elements of the machine can be mounted on only three vertical sliding blocks, since each of them comprises all the pieces that can move it. And each of these blocks may comprise two or more elements, which may be bars, spindles, straps, or guides, as mentioned above.

In a more preferred embodiment, the mobile ring is supported on the supporting plate by means that allow the mobile ring to rotate with respect to said plate, always keeping the geometrical axes of the plate and the mobile ring invariable and coincident.

In a more preferred embodiment, the filament heating element is fixed on an orientation ring (4.3) of the heater, capable of surrounding the printing nozzle.

In another more preferred embodiment, the filament heating element is selected from an electrical resistance, a source of electromagnetic radiation, a hot air current, or a jet of oil or hot water.

In a more preferred embodiment, the orientation ring of the filament heater is capable of rotating by a double bearing system (10.6 and 10.7), which is driven by at least one motor, such that said orientation ring is capable of locating the filament heating element on the printing filament for heating it or cooking it according to the requirements of a recipe, or an ingredient.

In yet another preferred embodiment, the orientation ring of the filament heater comprises a wireless electrical charge module comprising a fixed coil located at the head block (10.8) and a movable coil located on the orientation ring (10.9) of the filament heater, which allows the orientation ring of the filament heater to rotate 360°.

In a more preferred embodiment, the printing head is capable to move in the polar coordinates of angle $\phi$ and radius R.

In yet another preferred embodiment, the printing head (2.7) comprises printing cartridge housings, with a circular section and fixing means to hold up to 6 printing cartridges.

In a more preferred embodiment, the cartridge housing comprises a piston acting as an extruder (10.1), such that said piece is connected by its axis to a spindle (10.3) capable of advancing or retracting, threaded into a fixed nut (10.4).

In yet another preferred embodiment, the machine includes a supporting plate for motors that drive the piston capable of pushing an ingredient contained in a cartridge, said plate is capable of following the movement of the printing head, dragged by it, with its own sliding attachment to the vertical sliding blocks of the fixed body.

The motors are driven from the electronic device but not the movement of the motor supporting plate which is dragged by the printing head.

In a preferred embodiment, the oven has the shape of a cylindrical or prismatic housing, with heating elements arranged on its wall (6.2), said oven is able to slide on a sliding block (6.3) so as to allow the printing base to be housed inside the oven.

In a more preferred embodiment, the wall heating elements (6.2) of the oven are selected from electrical resistances, electromagnetic radiation sources or hot air jets.

In a preferred embodiment, the printing base comprises a flat sheet or tray (5.4) in which the printing is performed, which is fixed to the printing base in such a way that the tray remains horizontal.

In a more preferred embodiment, the printing base comprises a fixing system for the tray selected from:
  a protrusion (5.5) that engages projections with particular shapes on the bottom of the tray (5.4) with identical indentations in the printing base or vice versa, or
  magnet systems (5.8), for example, arranged in the tray.

The protrusion of the printing tray can fit (5.5) onto a plate, just like a conventional ceramic plate but with a hole for it to fit the protrusion, and so that it can be served on the table after printing.

In a preferred embodiment, the machine also includes at least one door (7.8) that allows to insert a flat tray to print the cooked food and openings (7.9)—ventilation grids—that permit air circulation inside the machine.

In a preferred embodiment, the machine further comprises a ring shaped sliding plate (9.4), parallel to the supporting plate and attached thereto, so that the supporting plate pulls the sliding plate when it moves. Said sliding plate comprises:
  a second ring (9.5), attached to the mobile ring (9.7; 2.3),
  a displacement device (9.6; 11.1), parallel to the R-axis and located above it,
  a supporting plate (11.2) for the motors, which slides over the vertical displacement device and comprises the motors driving the extruder and the motors driving the orientation ring of the filament heating element (11.4), capable of being moved synchronously and simultaneously to the printing head.

In a more preferred embodiment, the machine further comprises temperature sensors that allow the control by an electronic device, of the cartridge temperature, the nozzle temperature, the filament heater temperature and the oven temperature.

In a more preferred embodiment, one or more of the following components:
  the supporting plate,
  the printing base,
  the head,
  the oven
  and the first, second, third heating elements
is controlled by an electronic device containing a data file of different cooked foods and with the ability to give orders through an orientation system.

Another aspect of the present invention refers to a system for obtaining a cooked food comprising an electronic device provided with a software with a data file capable of sending orders of the position of each point of the object in Cartesian coordinates and the displacement speed of the nozzle between each point and the next and temperatures for the cooking of the different foods and a 3D printing machine capable of printing several cooked foods simultaneously as defined above.

Another aspect of the invention relates to the procedure of obtaining a cooked food by means of 3D printing which comprises printing said food using the three-dimensional printing machine defined in the present invention, and in which the printing is carried out layer by layer in polar coordinates, using in each of the layers one or more ingredients of said food.

In the three-dimensional printing machine for cooked food one or more of the following movements are possible and are controlled by a computer through an orientation system:
  vertical displacement of the printing units independently by sliding on the vertical displacement devices,
  independent vertical displacement of the supporting plate, sliding on the vertical displacement devices,
  rotation of the mobile ring in relation to the supporting plate,
  sliding of the printing head along the R-axis,
  rotation of the filament heater orientation disk,
  vertical displacement of the printing base, by sliding on at least one of the vertical displacement devices,
  vertical displacement of the oven, for example, by sliding on at least one of the vertical displacement devices.

By virtue of these capabilities of the machine of the invention, the process for obtaining food comprises performing one or more of the following movements:
  vertical displacement of the printing units independently,
  independent vertical displacement of the supporting plate,
  rotation of the mobile ring in relation to the supporting plate,
  sliding of the printing head along the R-axis,
  rotation of the orientation disk of the filament heater,
  vertical displacement of the printing base, and
  vertical displacement of the oven, sliding on at least one of the vertical bars.

A preferred embodiment relates to the process of obtaining a food, which comprises
  introducing into the printing cartridges housings, the sufficient cartridges for a cooked food, each containing one ingredient,
  providing a flat tray on the printing base,
  sliding the printing base vertically to the appropriate position for dispensing the food ingredients, in the form of a printing filament,
  locating the printing base at the required distance from supporting plate by means of a data file from a computer program,
  adjusting the required temperatures for the initiation of the printing on each of the heated elements,
  displacing the printing head on the R-axis and/or rotate the mobile ring so as to position the printing nozzle (4.2) of a cartridge at the printing starting point,
  adjusting the filament output speed and nozzle movement to draw a layer with an ingredient, at each point the filament output speed and orientation of the filament heating element is controlled so that the content of the cartridge falls exactly onto the tray or onto the previously deposited filament if printing had already started.

In a more preferred embodiment, the procedure further comprises, before or during the dispensing of an ingredient, one or more of the following operations:

heating the cartridge,
heating the nozzle,
heating the filament.

In a more preferred embodiment, the procedure further comprises baking at any intermediate stage of the printing or at the end of the process, obtaining the cooked food ready for consumption.

A last aspect of this invention relates to the use of the three-dimensional printing machine for the preparation of edible products.

DETAILED DESCRIPTION OF THE INVENTION

The present invention relates to a 3D printing machine that produces a three-dimensional edible object layer by layer with an additive manufacturing method. The machine is specially designed for three-dimensional printing and simultaneous cooking of food products through complex processing, which includes several ingredients and particular three-dimensional shapes.

In this section a printing machine is described according to a particular embodiment, making mention in some fragment to alternatives on some of the characteristics of the machine.

According to a particular embodiment, the invention relates to a three-dimensional printing machine for cooked food (FIG. 1) that is based on the vertical displacement of at least three movable bodies: a printing block containing the cartridges and their guiding system (1.6), a printing base on which the dish is printed (1.2) and an oven (1.8) that can be positioned around the printing base or moved away from it depending on the requirements of the recipe, capable of sliding independently on a system of bars or spindles that are anchored to a lower and an upper base forming a fixed body (1.1) and that allow to construct an edible object with a three-dimensional form (the dish (1.2)) previously defined in a data file, starting from one or several ingredients contained each one of them in a cartridge (1.3) that contains a nozzle (1.4) whereby the ingredient in form of filament is produced (1.5) and deposited on the edible object in construction at the same time that it is cooked with four independent heating elements according to a series of instructions contained in the data file following a particular recipe.

Since the three movable bodies can slide vertically along the bars of the fixed body, they allow to stack several printing modules (FIG. 1a) that will move in an independent manner, driven by a computer for placing them at different heights thus allowing the simultaneous printing of several dishes. Once the printing of a dish is finished, the corresponding printing assembly will move to the convenient height for an operator to take out the printed dish, remove the used cartridges and load the new ones for a new printing. In this way the modular machine of the present invention occupies the floor area which would be required for a machine capable of printing a single dish. Moreover, this configuration allows the heating of the dish assembly by introducing the printing base into the oven at the required times by moving either the oven or the printing base. In this way it is possible to cook a printed piece at high temperature and then add an ingredient in cold conditions (all this occurs inside the machine of the invention, since the plate comes out of the machine completely cooked and ready for consumption). Also in this way, the oven and printing base can be distanced from the printing head while cooking a partially printed plate, so as not to alter the ingredients that may remain in the cartridges.

One of the essential features of this machine is that it incorporates four heating modes that allow the ingredients to be cooked while the dish is being printed.

It contains a orientation system of the heating element (which has been called the orientation disk of the filament heating element) that cooks the filament of an ingredient immediately after it is deposited in the dish.

Another essential feature of the machine is to control the position of the printing nozzle (4.2) in a polar coordinate system by a combination of a rotation and a displacement. The polar coordinate system allows the movement of the head to be effectively adapted to the common circular shape in kitchen recipes. The configuration of the printing nozzle guide (4.2) by means of a mobile ring incorporates a diametrical axis along which the printing head moves.

Next, in the following sections called A, B and C various sections of the machine are described according to a particular embodiment:

A.—The printing block (FIGS. 2, 3 and 4) comprises
  a circular or polygonal supporting plate (2.1), capable of sliding vertically along vertical bars or spindles fixed to the machine housing, (2.2)
  a mobile ring (2.3), capable of rotation about its geometrical axis by means of a linear guidance system (2.4) fixed to the supporting plate and comprising a diametrically arranged sliding guide, which we call the R-axis (2.5), consisting of one or more bars or spindles supported on the mobile ring by supports (2.6),
  a printing head (2.7), with displacement capability along the R-axis (2.5) such that the printing head moves in a polar coordinate system, by the combined movement of rotation of the mobile ring and displacement in the R-axis. The printing head allows to house at least one printing cartridge (3.1) containing an ingredient and includes a piston (3.2), capable of increasing the pressure inside the cartridge such that the ingredient is extruded through a printing nozzle (3.3) included in the printing cartridge (3.1) forming the filament (3.4) which is deposited on the dish being printed.
  at least one first heating element, called cartridge heater (3.5) fixed on the printing head, to heat a cartridge.
  at least a second heating element, called a nozzle heater (3.6), for uniformly heating a printing nozzle, positioned at the end of the cartridge fixing means located on the printing head,
  at least a third heating element called the filament heater (4.1), which can be orientated in such a way that said heating element is always behind the printing nozzle (FIG. 4a) and in the forward direction of the of the printing head. To orientate the filament heating element, the same is fixed on an orientation ring (4.3) of the heater, which is able to surround a printing nozzle, without making contact with it thanks to a unique design that allows the inclusion of heating elements in parts with a 360° rotation capability.

B.—The printing base (5.1, FIG. 5) is fixed on a support (5.2), that can slide on at least one displacement device, for example, one formed by one of the vertical bars or spindles (5.3), allowing the vertical displacement of said printing base.

C.—The oven (6.1, FIG. 6) has the shape of a cylindrical or prismatic housing, with heating elements arranged on its wall (6.2), said oven is capable of sliding on vertical bars or spindles (6.3)—example of a sliding block—such that it allows the printing base to be housed inside it when required by the cooking of the dish (see FIG. 6b).

The filament heater's orientation disk may also have an element capable of depositing a layer of an ingredient, for example, a liquid, on the face of the filament remaining on the external part of the dish (for example, an oil or other type of fat, an egg derivative or egg analogous or one of its components, a sugar or its derivative or analogous, honey).

The pressure exerted on the ingredient contained in the printing cartridge and which drives it out through the printing nozzle is controlled by a computer using the slide of a piston (3.2).

The movements are carried out by step motors located either in the moving elements themselves, connected to the moving elements by means of rigid axes or spindles, and moving with them, or at fixed points in the housing.

The temperature of the printing cartridge, the temperature of the printing nozzle, the temperature of the filament heater and the temperature of the oven are controlled by a computer during the printing process, using temperature sensors and operating the necessary heating elements. In addition, the booth (i.e. the interior of the machine) has fans (7.10, FIG. 7*b*)) located on the upper base (7.7) of the fixed body behind the ventilation grids (7.9) that make the hot air to exit from the interior at the times required to lower the temperature inside the booth, these fans are also driven by the computer.

The process for obtaining cooked food by means of 3D printing comprises printing the food layer by layer in polar coordinates and is based on a series of stages:
  introducing into the print cartridge housings sufficient cartridges for a cooked food, each containing one ingredient,
  arranging a flat tray on the printing base,
  sliding the printing base vertically to the appropriate position for dispensing the food ingredients, in the form of a printing filament,
  starting a computer program that, by reading a data file, places the printing body at the appropriate height for printing. Once the assembly is positioned, the printing base is placed at the necessary distance from the supporting plate, adjusts the necessary temperatures for the start of printing on each of the heated elements, moves the printing head on the R-axis and/or turns the mobile ring so as to position the printing nozzle of a cartridge at the point of the start of printing and from there it adjusts the output speed of the filament and the movement of the nozzle to draw a layer with that ingredient. At each point, the filament output speed and the orientation of the filament heating element is controlled so that it falls precisely on the deposited filament. Then, the operation is repeated with each of the ingredients comprising the recipe and once the printing of the first layer is finished, move the printing base vertically to separate it from the printing nozzle (4.2) the amount stipulated in the data file and repeat the process with the next layer, repeating the printing process in as many layers as necessary to finish the dish. The temperature of each element is controlled by the computer in each layer being printed.
  Once the printing and cooking process is finished, the printing body and each of the three movable bodies will be positioned in a determined way to allow the extraction of cartridges and the dish built on the printing base. The dish is taken out of the machine ready to be consumed.

According to the 3D printing and cooking process of the invention, an edible product (dish) cooked is obtained from several ingredients collected each one of them in an independent cartridge, and which can be dispensed by means of a piston that acts as an extruder included in the cartridge itself, with a particular design adapted to each ingredient, thermostatized both in the extrusion nozzle and in the body of the cartridge and with independent temperature control for both and which is an object of this invention. The controller of the machine allows the creation of a three-dimensional object (the dish), on a printing tray with a cylindrical or polygonal shape, with an additive manufacturing technique, using in each of the layers one or more ingredients according to the recipe. The yarn generated by extruding the ingredient from its cartridge (the filament) acquires the necessary rheological properties for printing by using certain food additives and controlling the temperature inside the cartridge and the extrusion nozzle. The cooking of the food starts immediately after it is deposited on the edible object being printed. Again, the action of certain food additives and the cooking itself gives the consistency necessary to print the dish and adhere it to the previously deposited layer. The additives, if necessary and for each ingredient, are included in the printing cartridges, such that for example, an additive such as a thickener that must have a cream so that when it comes out of the cartridge nozzle it solidifies, is included in the printing cartridge containing that cream. For this purpose, the machine has an orientation disk for the filament heater, which is an object of this invention, which makes it possible to orient the filament heater element to place it at any time behind the printing nozzle (4.2) and in the forward direction of the printing head. The controller determines at each moment both the angular position of the filament heating element and the parameters determining the heat received by the filament (temperature of a hot tip, flow and temperature of the air, driven oil or water, intensity or pulses of the electromagnetic radiation), in order to adapt them to the speed of travel of the printing head and the recipe requirements.

The three movable bodies (printing block, printing base and oven) have vertical displacement capabilities such that, as required, once the printing of the dish is finished, or at any intermediate moment, the printing base on which it has been deposited can be surrounded by a cylinder or prism shaped contour containing heating resistances on its inner surface (the oven). The oven can slide vertically to surround the printing plate, commanded by the controller, and heat the dish either to produce a golden exterior, to finish the cooking, or simply to heat the dish assembly.

In the production of the dish is essential the combination of the four cooking modes implemented: heating of the cartridge, heating of the nozzle, heating of the filament and final cooking allow to obtain the final result.

This three-dimensional printing machine for cooked food is used for the production of edible products.

BRIEF DESCRIPTION OF THE FIGURES

FIG. 2*b* shows bars and spindles arranged on the R-axis through which the printing head slides.

FIG. 3*a* shows the housings that comprise the printing head, of variable section, and preferably circular, and fixing means for holding up to 6 printing cartridges (FIG. 3). The fixing means for the printing cartridges can be arranged in such a way that the printing nozzles are located on a concentric circumference to the mobile ring shown in FIG. 3a.

EXAMPLES

The invention will now be illustrated by way of example embodiments.

Figure 7:
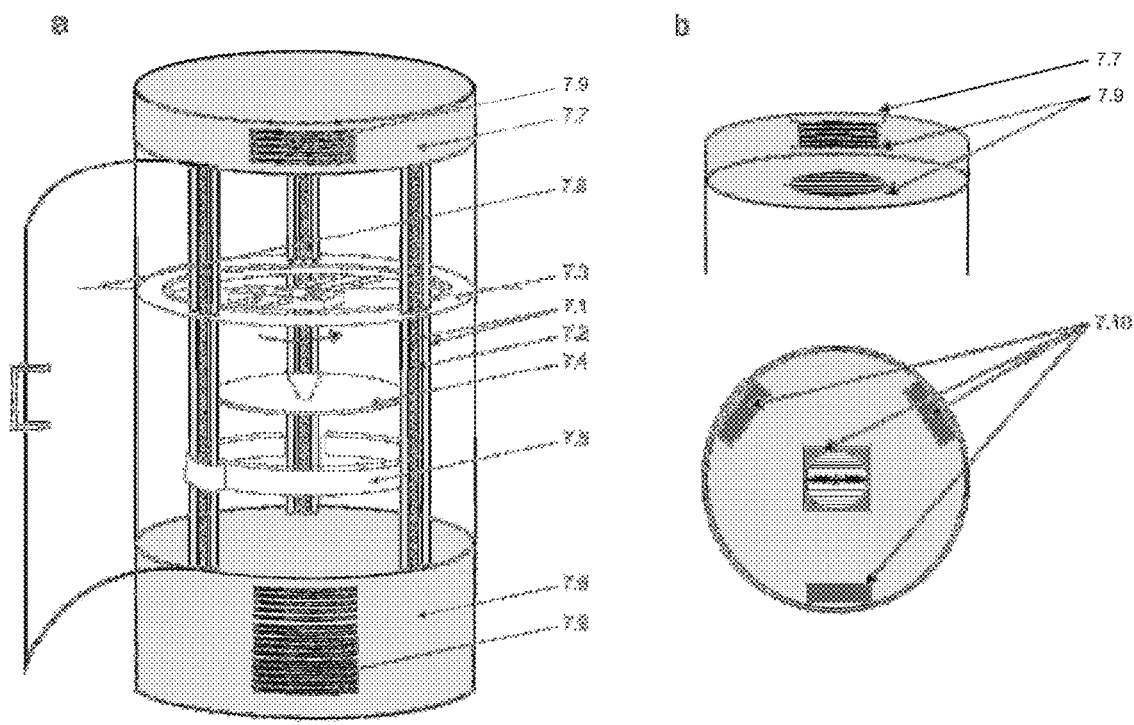

Composition of the Fixed Body and the Movable Bodies in a 3D Printing Machine for Cooked Food FIG. 7 shows an exemplary embodiment of the fixed body and the movable bodies in a machine with a single printing assembly. It is formed by a configuration of 3 groups of vertical bars (7.1), spindles (7.2), according to a specific arrangement (in the Figure they are represented, as an example, by two bars and a spindle arranged between them), to drive the movement of the elements that must slide on the z-axis: the supporting plate (7.3), the printing base (7.4) and the oven (7.5). The bars are fixed at their lower end to the lower base (7.6) of the structure, and at their upper end to the machine head, or upper base (7.7). Both the spindles and the bars are fixed to the base and the head of the structure. The displacement is performed by step motors located on the movable body itself, by means of gears that rotate on the spindle.

The supporting plate slides on the three sets of two bars by means of bearings or linear guides and its vertical displacement is driven by three step motors, each one of them geared on a spindle.

Figure 5:
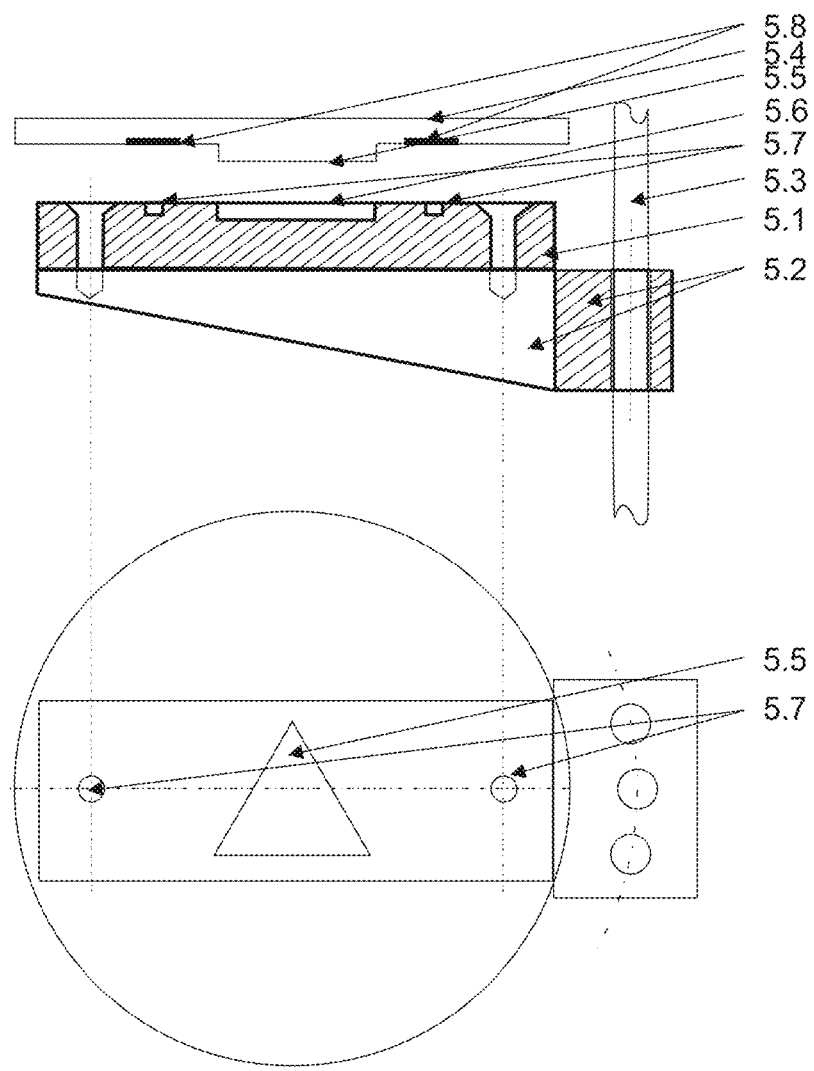
FIG. 5. Printing base.

The printing base slides on one of the sets of two bars and one spindle by means of a support that makes it cantilevered, as shown in FIG. 5, its vertical displacement is driven by a single step motor geared on this spindle.

Figure 6:
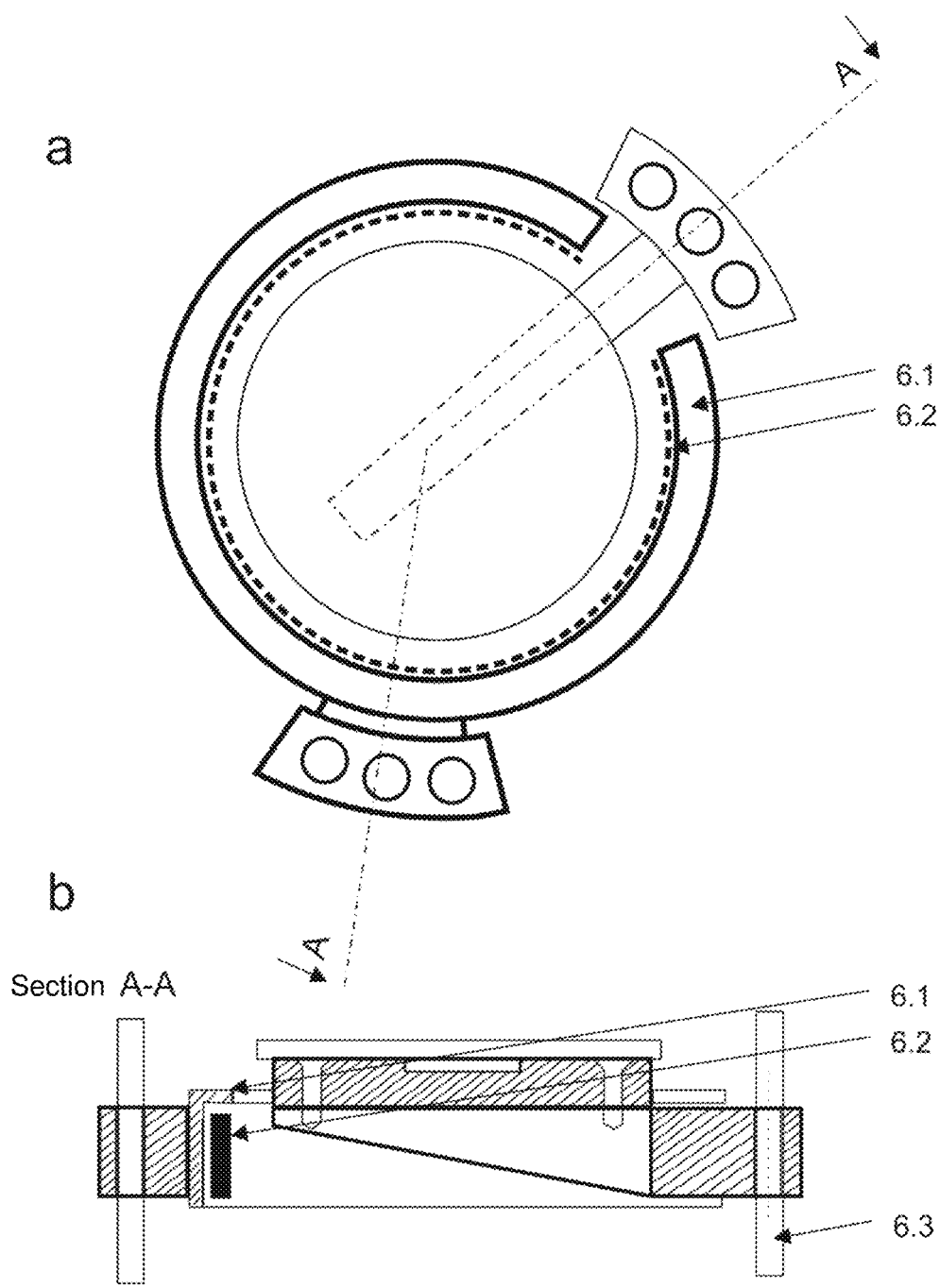
FIG. 6. Particular embodiment of the engagement of the printing base in the oven FIG. 7. Particular embodiment of the fixed body assembly and a mobile printing assembly.

The oven slides on a set of two bars and a spindle different from the one used in the printing base, being cantilevered and sliding by a motor located on the oven itself and geared with its spindle. An opening on the side wall of the oven allows it to slide vertically to completely surround the printing base as shown in FIG. 6.

Embodiment of a Modular Machine With Several Printing Units

Figure 1:
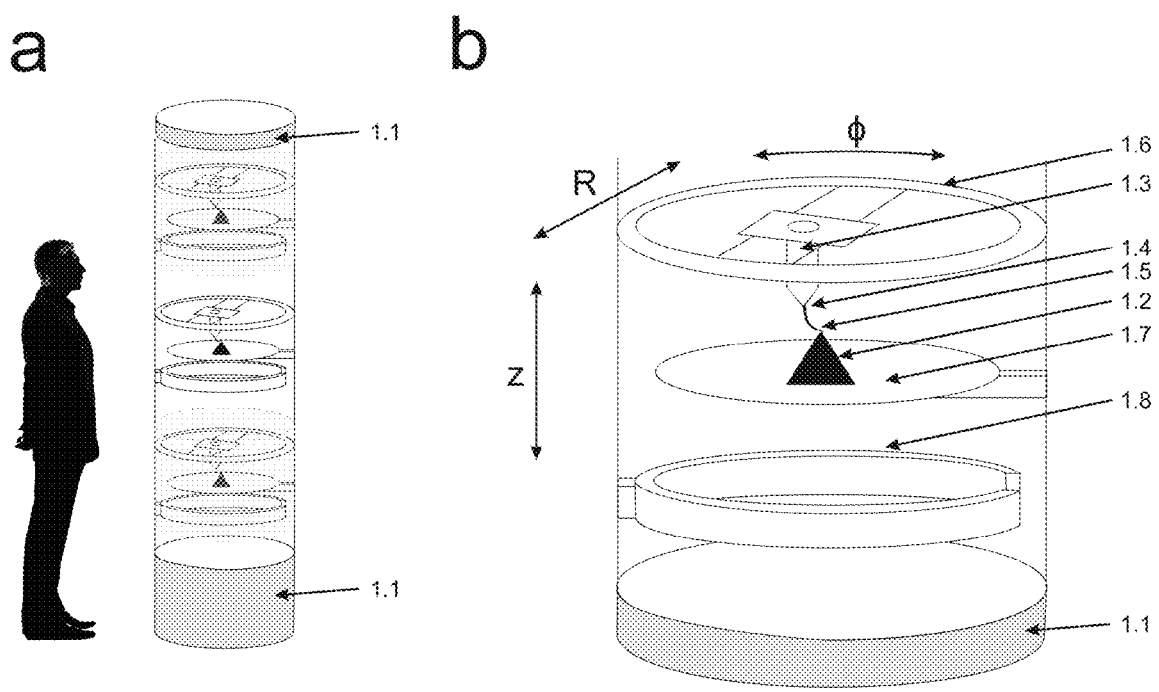
FIG. 1. General outline of the modular machine (a) and one of the printing sets (b).

The fact that the motors are fixed on each of the moving elements allows the vertical sliding of the movable bodies of different printing assemblies to use the same spindles and the machine can be built with three fixed spindles only containing any number of printing assemblies, as shown schematically in FIG. 1. The vertical displacement of each moving element is controlled independently by the computer.

Other Embodiments That Allow Vertical Displacement

Figure 8:
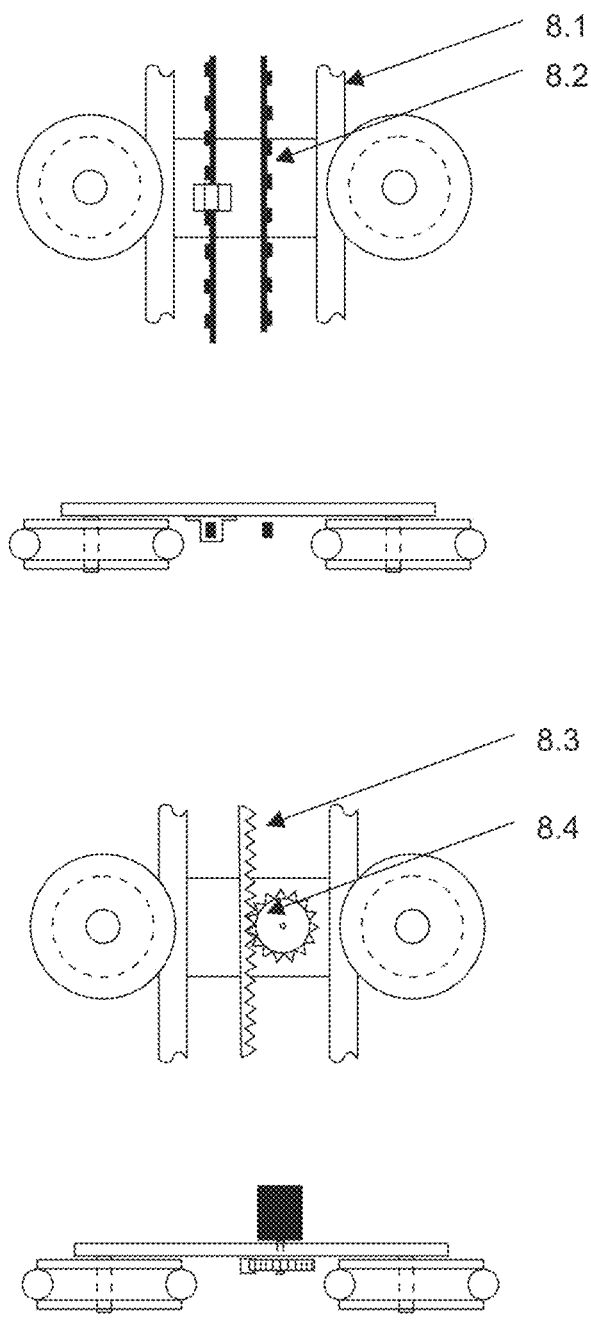
FIG. 8. Particular embodiment of guides that allow the vertical displacement of the different movable bodies.

The sliding by means of axial bearings along the vertical bars can be replaced by any other sliding system with linear guidance, composed of fixed vertical guides with any transverse profile and wheels or bearings that slide on them (FIG. 8).

The vertical spindles can be replaced by straps or toothed guides fixed vertically on the fixed body structure. In this case, sliding is done by gears located in the movable body (FIG. 8).

Arrangement of the Mobile Ring on the Supporting Plate

Figure 2:
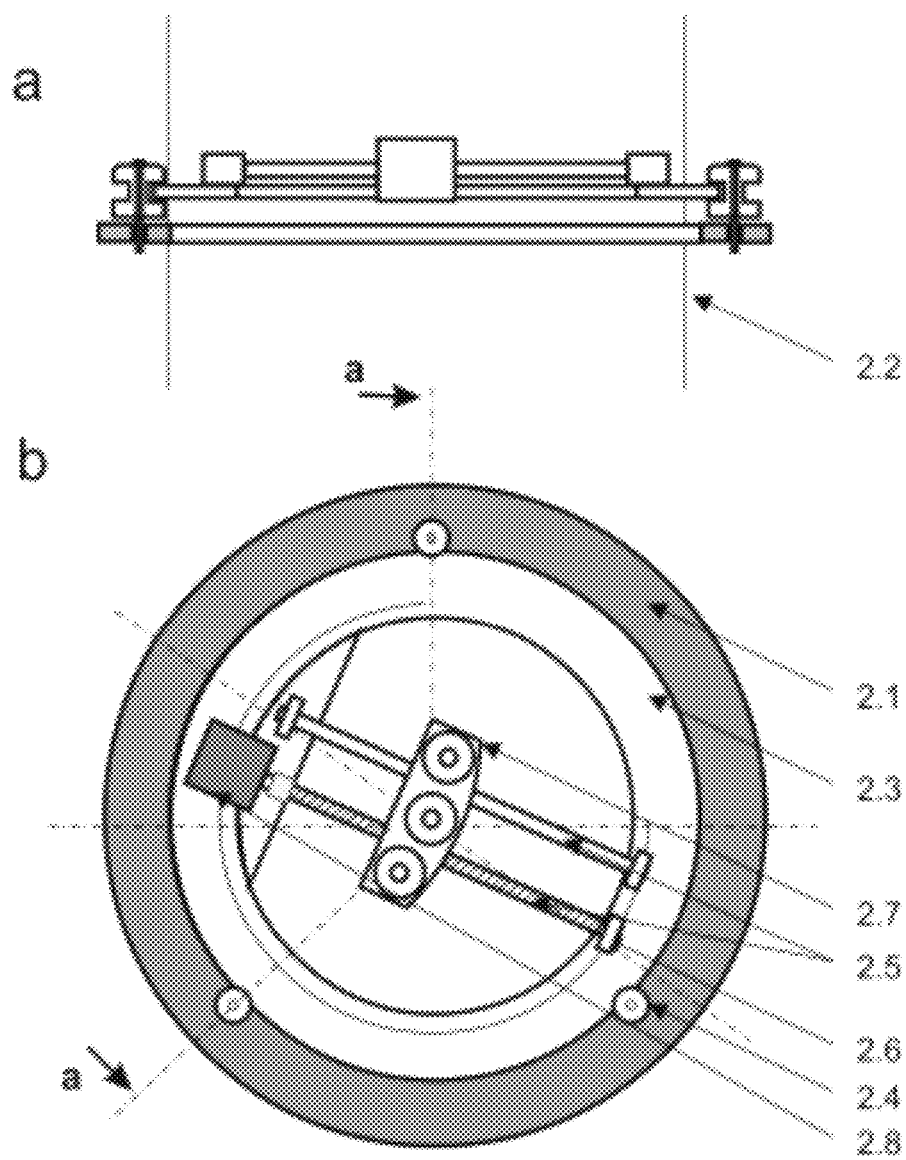
FIG. 2. Mobile ring and supporting plate. Operation of the ring rotation movement.
Figure 9:
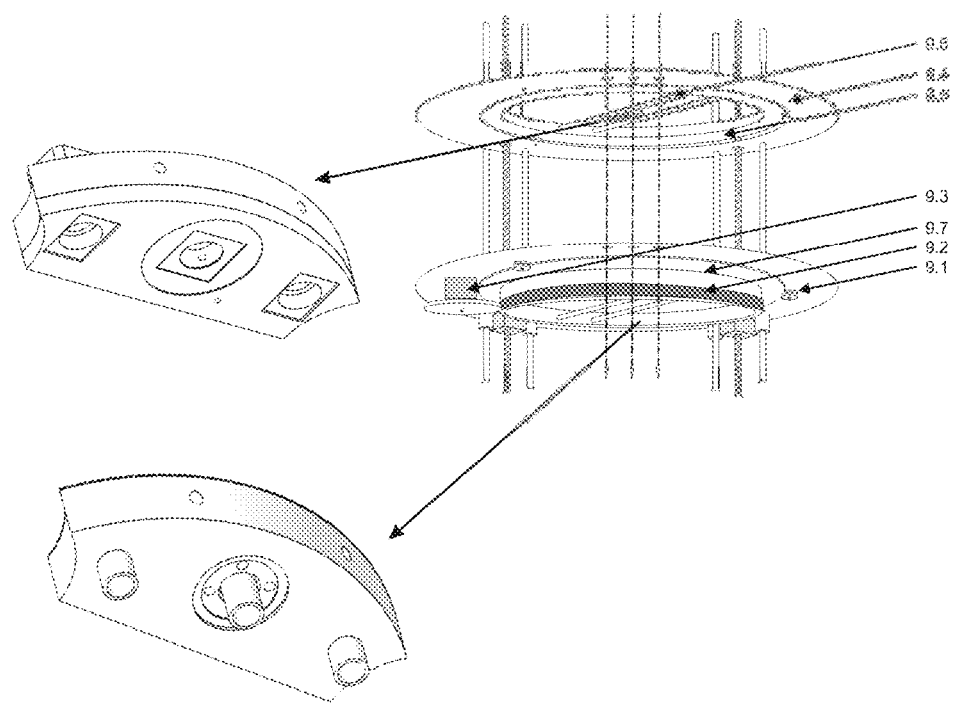
FIG. 9. Particular embodiment of the supporting plate and mobile ring assembly.

The printing head can be displaced on the R-axis, located diametrically on the mobile ring, which is rotated by means of a linear guiding system (2.4; 9.1). The supporting plate has an inner circular cutout and its outer shape can be circular or prismatic, adapting to the arrangement of the vertical bars (FIG. 2). The mobile ring is supported on the supporting plate by any system that allows the mobile ring to rotate with respect to the supporting plate maintaining invariable and coincident at all times the geometric axes of the inner circle (FIG. 9) of the supporting plate and that of the mobile ring. Both the displacement of the printing head on the R-axis and the rotation of the mobile ring with respect to its geometrical center are controlled by computer-controlled step motors.

The mobile ring can have any cross section that allows the support points to be installed on the supporting plate and a driving system. In a particular application and without loss of generality, the mobile ring is anchored by three or more bearings (linear guidance system 2.4; 9.1), which can rotate freely on their axes which are fixed on the supporting plate. The edge of the outer or inner contour of the mobile ring slides on the linear guidance system (2.4), which in a particular embodiment are the bearings. These three or more fixed points of the mobile ring contour determine and make invariable the position of its axis in any displacement of the printing nozzles. Also in a specific application and without loss of generality, the contour of the mobile ring has a toothed strap (9.2) that engages with a pinion (9.3) whose axis is fixed to the supporting plate. The gear formed by the pinion and the strap transmits the movement to the mobile ring from a step motor placed on the supporting plate.

R-Axis Arrangement

The printing head can be displaced along at least one axis which is diametrically arranged in the mobile ring and supported on the ring at its both ends by two supports (2.6). The displacement of the printing head on the axis is driven by any means capable of transmitting the rotation of the motor axis of a step motor to the sliding of the head. In two specific applications and without loss of generality, this type of mechanical transmission can be done by a spindle or by a transmission strap. The motor (2.8) is located on the mobile ring (2.3).

Printing Head

When printing the object layer by layer, it is necessary that some kind of physical or chemical transformation takes place in the printing material from the moment it passes through the nozzle until it firmly adheres to the lower layer of the object and becomes mechanically consistent. For example, in the case of molten plastic printing, this transformation comes simply from the change in temperature from the time the polymer passes through the nozzle, at high temperature, melting and acquiring a fluid consistency to cool down when it touches the already printed surface of the object, thus re-solidifying. In other cases, however, adhesion to the previous layer of the object requires a chemical reaction to take place, which can be accelerated by an increase in the temperature of the material once it has been deposited on the lower layer of the object.

In other cases, it may be the dehydration of the printing material once it comes out of the nozzle that makes it acquiring consistency and this requires an application of a heat source directly on the strand of printing material. This type of actions is especially relevant in the simultaneous printing and cooking of edible products.

Figure 10:
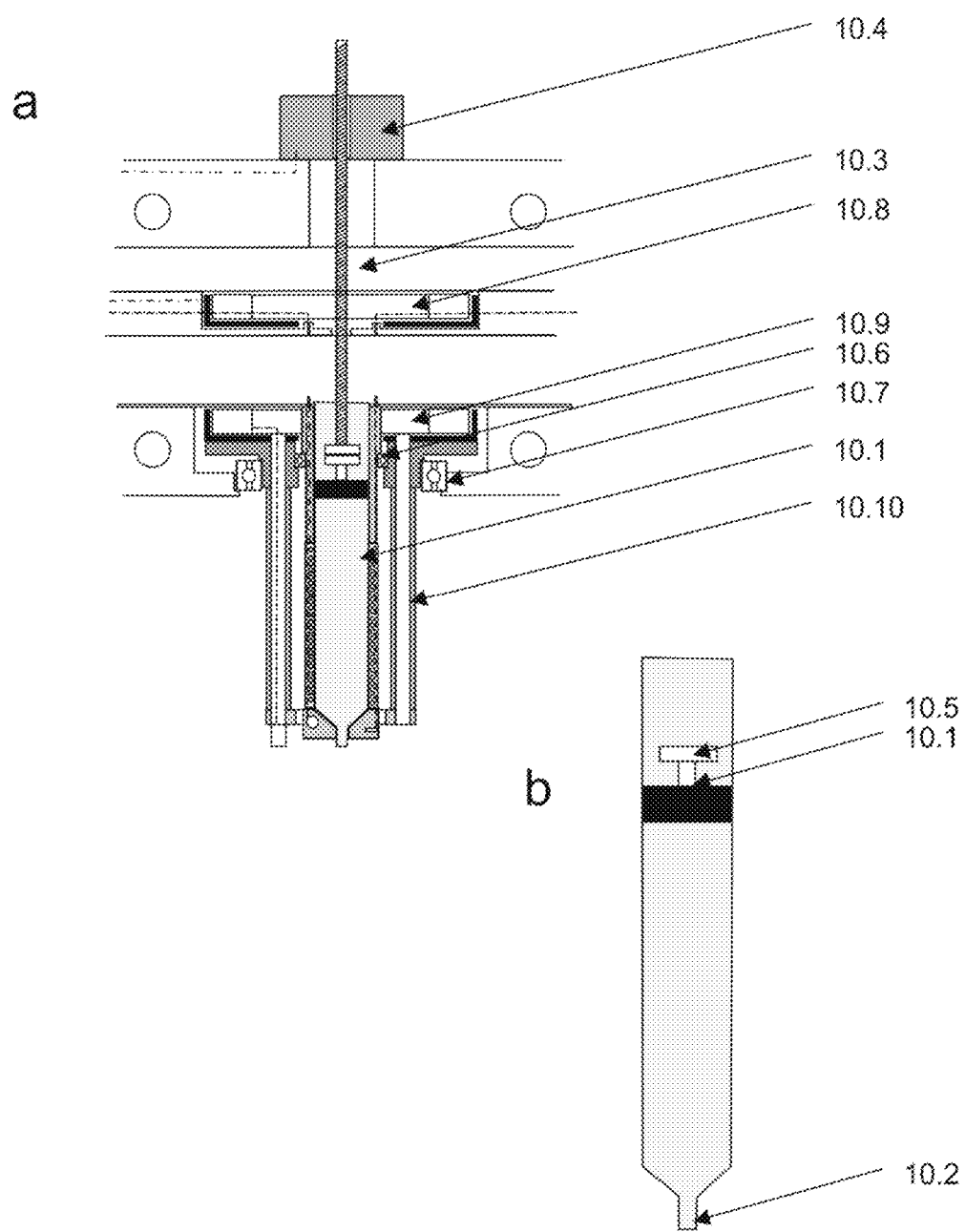
FIG. 10. Particular embodiment of the ingredient extrusion system

Each ingredient is contained in one printing cartridge. At some point in its base is the extrusion nozzle, a conduit with a cross section and length and geometry appropriate to the rheological properties of each ingredient and the three-dimensional shape of the dish that allows the exit to the outside of the ingredient pushed by the pressure generated inside the printing cartridge by means of a computer-controlled drive. In a particular embodiment (FIG. 10), the printing cartridge has a circular cross section, it is closed at the top by a piston that acts as an extruder (10.1) by sliding inside and pushing the ingredient through the nozzle (10.2) located at the bottom. The axis of the piston is connected to a spindle (10.3) which moves forward or backward upon rotation because it is threaded into a fixed nut (10.4). The printing nozzle is integrated in the cartridge. In a particular embodiment the cartridges are made of a material suitable for food preservation and are disposable. The piston is also integrated in the cartridge, has a metallic element in solidarity with it, on the outside (10.5) and it is attached to the spindle by a magnet located at the end of that spindle.

Figure 11:
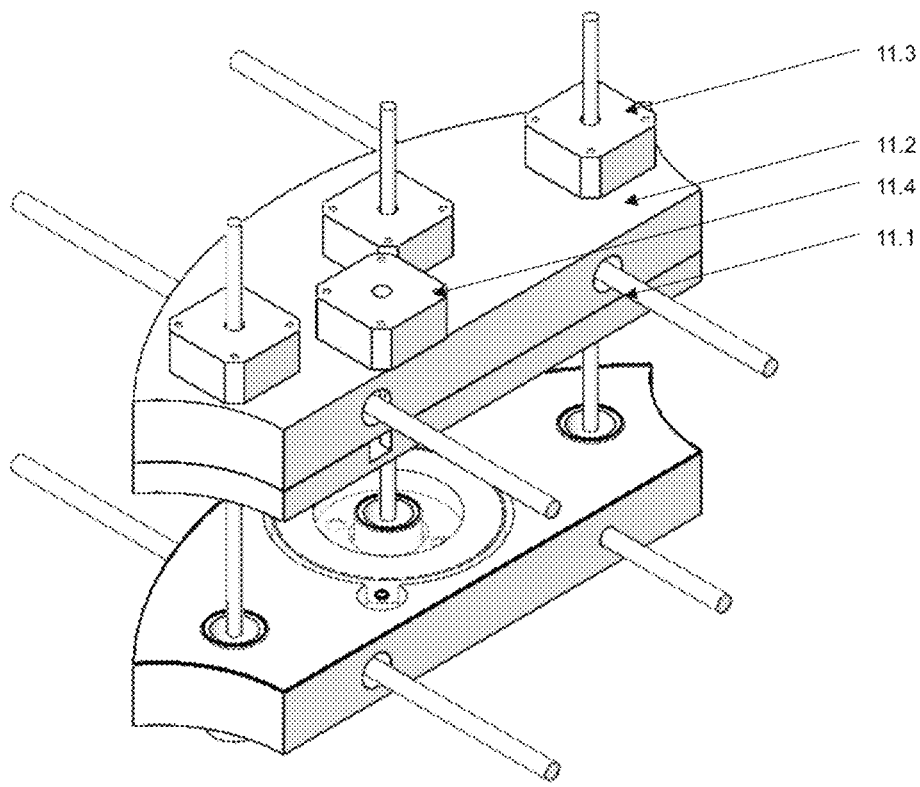
FIG. 11. Particular embodiment of the driving system of the motors that govern the printing head.

In a particular embodiment (FIGS. 9 and 11), to avoid that the weight of all the motors of the printing head falls on the mobile ring, the sliding plate (9.4) is built on the bars or vertical guides, and at all times parallel to the supporting plate and solidly connected thereto containing another ring (9.5) (solidly attached to the mobile ring) and a displacement device that we call a linear guide (9.6; 11.1) (which at all times will be parallel to the R-axis and located above it) which may consist of two bars on which a supporting plate (11.2) of the motors slides freely, which houses both the motors (11.3) which govern the pistons and the guide of the orientation ring of the filament heating element (11.4). The movement of this motor supporting plate is driven at all times by the printing head, without any new transmission elements requiring computer control.

Figure 4:
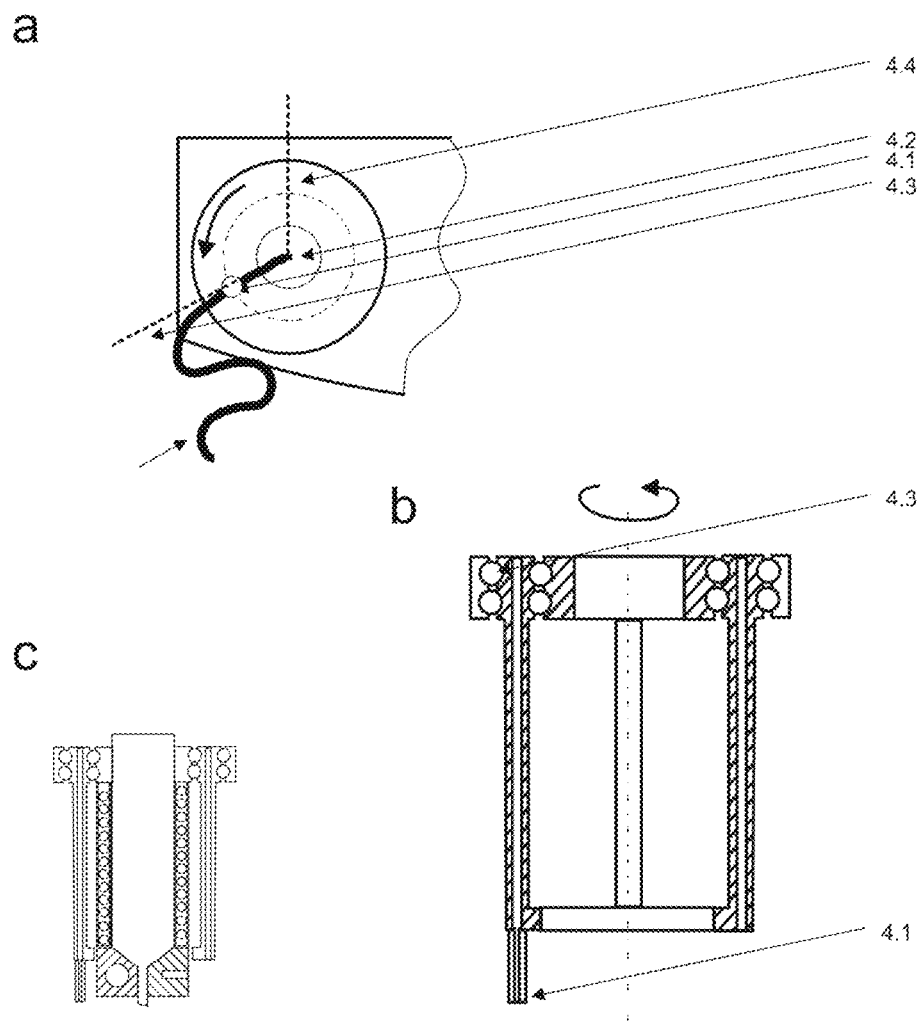
FIG. 4. Outline of the filament heater orientation movement.
Figure 12:
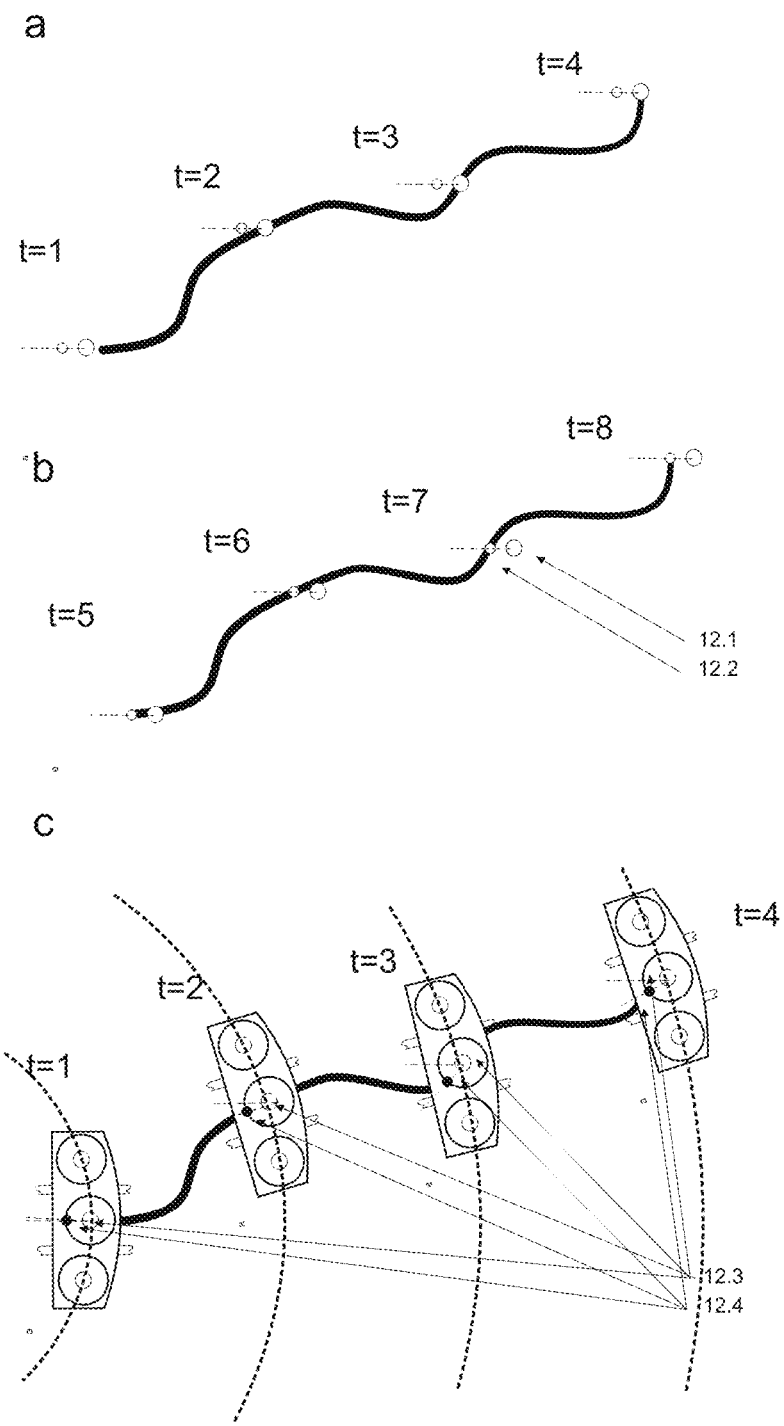
FIG. 12. Outline of the process of conventional printing and heating (FIGS. 12A and 12B respectively) and simultaneous heating and printing process of the present invention (FIG. 12C).

In a particular embodiment, the printing head of the machine, object matter of this patent includes three of the four heating elements used to cook the food while printing: The printing cartridge is surrounded by the heating element (3.5) of the cartridge, fixed on the printing head and on its surface it houses a temperature probe (3.7). The nozzle is surrounded by the heating element (3.6) of the nozzle and houses a second temperature probe (3.8) at some point on its surface. In this particular embodiment the filament heater (4.1 in FIG. 4) is located on the orientation ring (4.3) of the filament heater, which surrounds the printing nozzle (4.2) without touching it. The filament heater element can consist of a hot tip, which can be a metal rod ending in a sharp, flat or blunt tip, heated by an electrical resistance, or a source of any electromagnetic radiation, a hot air current or a hot oil jet. This heating element is fixed in the orientation ring. The orientation ring can rotate, driven by a step motor controlled by the machine control software such that the filament heating element is always positioned on the strand of printing material that has just been deposited. The double bearing system (10.6 and 10.7) shown in FIG. 10 allows the orientation ring of the filament heater to rotate while holding both the printing head body and the printing cartridge steady. To allow the orientation ring of the filament heater to rotate 360 degrees, a wireless electric charging module is provided with a fixed coil located in the head block (10.8) and a moving coil located in the orientation ring (10.9) of the filament heater. The fixed coil is anchored to the bottom of the motor supporting plate (11.2). Any fluid that employs the filament heater element would be stored inside the hollow bars (10.10) supporting the filament heater element. For precise control of the orientation of the filament heating element, the dish data file records the rotation angle (referred to a reference orientation set on the print nozzle) determined by the last two points at which the print nozzle was positioned (diagram in FIG. 4). FIG. 12 shows a diagram of the importance of the orientation of the filament heating element (12.2). If the position of the filament heater is fixed with respect to the nozzle (12.1), as shown in FIG. 12a, at different times (t=1, t=2, t=3, t=4) the filament heater would not be positioned on the newly deposited filament at all times and heat transmission would be imperfect, a second pass of the head over the printed filament would be necessary, placing the heater exactly on the filament as shown in FIG. 12b (times t=5, t=6, t=7, t=8). In the device of this invention (FIG. 12c) the orientation capability of the filament heater causes that in a single pass both the nozzle (12.3) and the filament heater (12.4) are simultaneously placed on the freshly printed filament so that the ingredient of which the filament is formed is deposited on the dish and cooked simultaneously.

Figure 3:
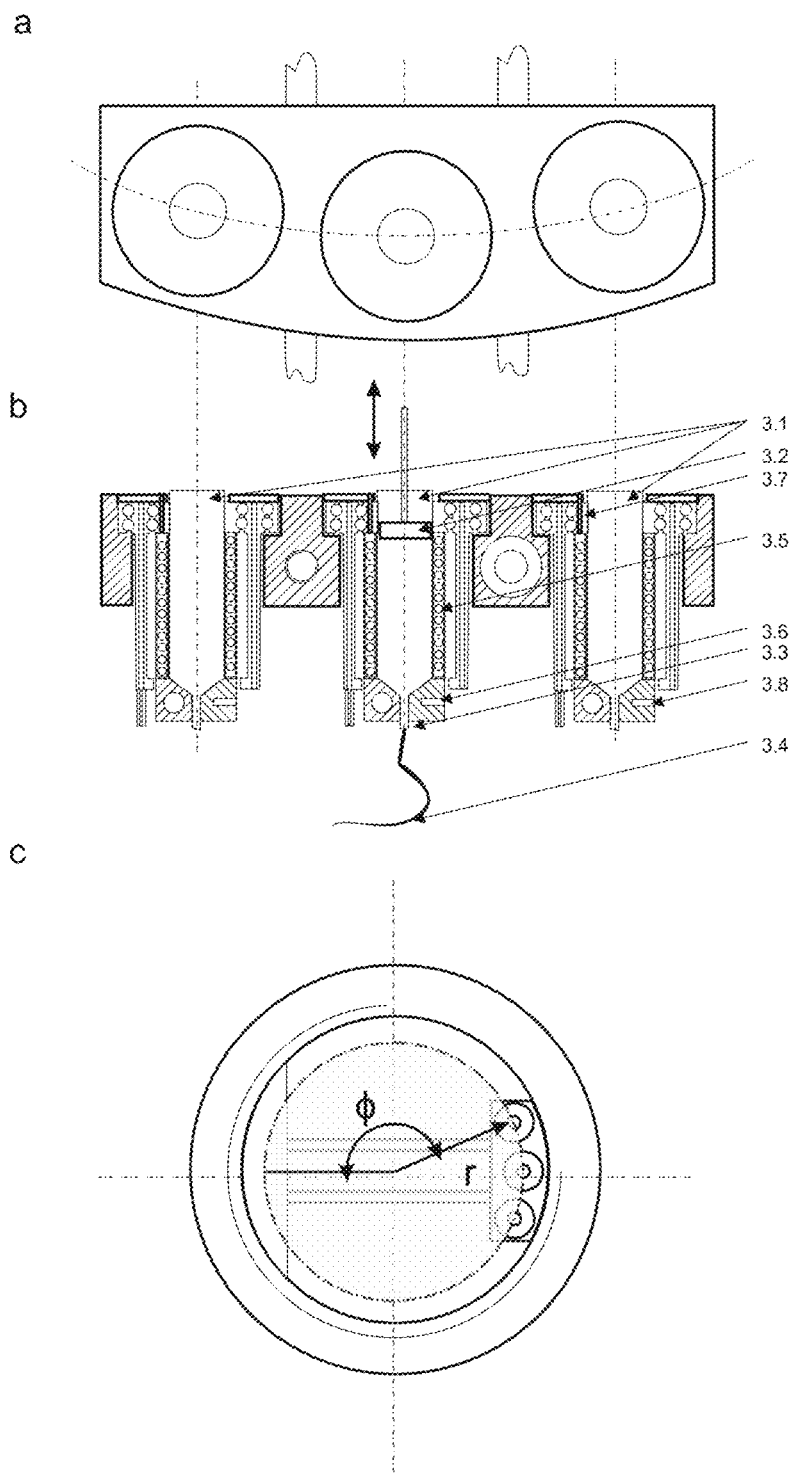
FIG. 3. Outline of the printing cartridge arrangement in the printing head.

The printing head is designed to hold up to 6 printing cartridges. The different printing cartridges are arranged radially in the printing head (FIG. 3). This arrangement allows the maximum use of the printing field. When the printing head is displaced at the maximum at the R-axis, the printing nozzles are arranged on a circumference whose center coincides with the axis of the mobile ring. In this way, by rotating the ring, any nozzle can reach any point in a circular area, centered on the center of the mobile ring. The dead space, which is not accessible to the print nozzle, is reduced to a circular crown with a width equal to the radius of a circumference surrounding the printing cartridge. The printable area is represented in gray in FIG. 3. This effect is especially interesting when printing objects whose base is close to a circular shape or is composed of curved shapes with a circular envelope, but the operation is equally adapted to figures formed by straight lines or with rectangular contours. The fact that the rotation that allows coordinate φ variation is made by the movement of the mobile ring leaves the whole inner surface diaphanous, available for the movement of the printing nozzles (FIG. 3).

Printing Tray

The printing is done on a flat sheet or tray (5.4), which is fixed on the printing base (5.1) by means of any system that fixes its position, keeps it horizontal and prevents it from moving during printing. As an example and without loss of generality, the tray has a raised part at the bottom, with any shape. In FIG. 5, the tray has a raised part in its lower part, as an example, a triangular shape (5.5) that fits in a slot (5.6) made in the printing base. In another application, the tray is fixed by means of magnets (5.8) located in the printing base, while the tray base is made of a metallic element or has metallic plates (5.8) fixed that adhere to the magnets. The tray (5.4) must be flat to allow layer by layer printing. The dish can be served directly on the tray or, for aesthetic reasons, the tray with the printed dish can be placed on a specially shaped support to serve it at the table. In this case the tray would fit into the base of that support exactly as it does into the printing base.

Data File

The data file of the dish to be printed will allow the computer to control the whole printing process, including the displacement of all movable bodies, the heat treatment to which each ingredient is subjected both inside the printing cartridge and in the printing nozzle, and after being deposited on the plate by collecting the temperature values measured by the temperature control probes and by operating the corresponding heating elements. It also collects the data of the ingredient impulse through the printing nozzle.

The information about the three-dimensional shape of the dish is contained in the data file that describes layer by layer the shape of the edible object in polar coordinates, i.e. each point of the object is defined by three coordinates: height, z, with respect to a plane 0 that sets the machine as the origin of this coordinate, the angle of rotation, φ, of the mobile ring, with respect to an origin set by the machine and the distance, r, between the nozzle and the geometric center of the mobile ring (FIG. 3). The points that form a layer of the edible object to be printed are listed in the order in which they must be reached by the printing nozzle during printing and the data file also contains the speed of movement of the head between each point and the next, the speed of extrusion of the ingredient, the temperatures required at each temperature control probe and, if applicable, the electrical energy, air, water or oil flow required at each heating element. The data file also includes at each point, the angle α (FIG. 4), formed between the line (4.3) (it is the imaginary line that the computer program takes as origin "0" of the alpha angle) that joins that point with the previous one in the printing order (4.3) and a fixed reference line (4.4) in the printing head, thus determining the orientation of the last section of the printed filament. This data will allow to orientate the heating element of the filament, exactly over the filament once deposited.

The invention claimed is:

1. A three-dimensional printing machine for cooking food comprising:
at least one printing module, wherein said printing module comprises at least three main movable bodies;
a printing block comprising heating elements capable of cooking food simultaneously to printing thereof;
a printing base;
a vertical displacement device;
an oven; and
a ring shaped sliding plate parallel to and attached to a supporting plate, the ring shaped sliding plate comprising:
a second ring attached to a mobile ring attached to said supporting plate, the mobile ring configured to rotate with respect to its geometrical axis by a linear guiding system fixed to the supporting plate;
a displacement device parallel to an R-axis and located above the vertical displacement device;
a supporting plate for motors configured to slide along the vertical displacement device;
piston motors configured to drive a piston; and
orientation motors configured to drive an orientation ring of a third filament heating element, the ring shaped sliding plate is configured to move synchronously and simultaneous to movement of a printing head;
wherein the main movable bodies are configured to slide vertically, independent of one another, along the vertical displacement device; and
wherein the vertical displacement device is formed by at least three vertical sliding blocks and is the same for every printing module of the at least one printing module.

2. The three-dimensional printing machine for cooked food according to claim 1, further comprising at least two printing modules having independent movement capability along a z-axis, wherein each of said at least two printing modules has a capability for printing a cooked food independently.

3. The three-dimensional printing machine for cooked food according to claim 2, further comprising a fixed body enclosing all the printing modules, wherein said fixed body also comprises:
the vertical displacement device;
a lower base; and
an upper base;
wherein the lower base and the upper base are connected to each other by means of the vertical displacement device fixed to the lower base and the upper base at ends of the vertical displacement device.

4. The three-dimensional printing machine for cooked food according to claim 3, wherein each vertical sliding block is formed by sets of elements selected from the group consisting of:
bars and thrust bearings;
spindles and gears;
linear guide and straps; and
toothed guides and pinions.

5. The three-dimensional printing machine for cooked food according to claim 4, wherein each vertical sliding block is formed by two bars and one spindle.

6. The three-dimensional printing machine for cooked food according to claim 1, wherein the printing block comprises:
the supporting plate, one of circular or polygonal, capable of sliding vertically along a vertical displacement device;
the mobile ring attached to said supporting plate, the mobile ring capable of rotating with respect to its geometrical axis;
a printing head, capable of displacing along an R-axis and in a polar coordinate system by the combined movement of rotation of the mobile ring and displacement along the R-axis, wherein said printing head is capable of accommodating at least one printing cartridge;
at least one first cartridge heating element fixed on the printing head to heat a printing cartridge.

7. The three-dimensional printing machine for cooked food according to claim 6, further comprising three vertical sliding blocks, such that:
the supporting plate is configured to slide over the three vertical sliding blocks;

the printing base is configured to slide along one of the vertical sliding blocks; and the oven slides on a sliding block different from the one along which the printing base slides;

wherein the supporting plate, the printing base, and the oven are capable of sliding by the action of at least one motor each.

8. The three-dimensional printing machine for cooked food according to claim 6, wherein the mobile ring is supported on the supporting plate such that the mobile ring is allowed to rotate with respect to said plate, always keeping the geometrical axes of the plate and the mobile ring invariable and coincident.

9. The three-dimensional printing machine for cooked food according to claim 6, wherein the third filament heating element is fixed on an orientation ring of the third filament heating element capable of surrounding the printing nozzle.

10. The three-dimensional printing machine for cooked food according to claim 6, wherein the orientation ring of the third filament heating element is capable of rotating such that said orientation ring is capable of locating the third filament heating element on a printing filament for heating or cooking it according to requirements of an ingredient.

11. The three-dimensional printing machine for cooked food according to claim 10, wherein the orientation ring of the third filament heating element comprises a wireless electrical charge module comprising a fixed coil located at the printing block and a movable coil located in the orientation ring of the third filament heating element, which allows the orientation ring of the third filament heating element to rotate 360°.

12. The three-dimensional printing machine for cooked food according to claim 6, wherein the printing head is capable to move in the polar coordinates of angle φ and radius R.

13. The three-dimensional printing machine for cooked food according to claim 12, wherein the printing head comprises printing cartridge housings that is capable of holding up to at least 6 printing cartridges.

14. The three-dimensional printing machine for cooked food according to claim 13, wherein the cartridge housing comprises the piston acting as an extruder, such that the piston is connected by its axis to a spindle capable of advancing or retracting, threaded into a fixed nut.

15. The three-dimensional printing machine for cooked food according to claim 14, comprising a supporting plate for motors that drive the piston capable of pushing an ingredient contained in the printing cartridge, said plate is capable of following, through its movement, the printing head.

16. The three-dimensional printing machine for cooked food according to claim 1, wherein the oven comprises one of a cylindrical or prismatic housing.

17. The three-dimensional printing machine for cooked food according to claim 1, wherein the printing base comprises a flat sheet or tray in which the printing is performed, which is fixed to the printing base in such a way that the tray remains horizontal.

18. The three-dimensional printing machine for cooked food according claim 1, further comprising at least one door that allows to insert a flat tray to print the cooked food and openings that permit air circulation inside the machine.

19. The three-dimensional printing machine for cooked food according to claim 1, wherein one or more of the:
the supporting plate,
the printing base,
the printing head, and
the oven is controlled by an electronic device containing a data file of different cooked foods and with the ability to give orders through an orientation system.

20. A system for obtaining a cooked food comprising an electronic device provided with a software with a data file capable of sending orders of the position of each point of the object in polar coordinates and the movement speed of the nozzle between each point and the next one, and temperatures for the cooking of the different foods and a 3D printing machine capable of printing several cooked foods simultaneously, defined in claim 1.

* * * * *